(12) United States Patent
Liu et al.

(10) Patent No.: US 7,945,072 B2
(45) Date of Patent: May 17, 2011

(54) OPTICAL MOTION SENSING PROCESS

(75) Inventors: Jian Liu, Shanghai (CN); Shuwei Hou, Xi'An (CN)

(73) Assignee: Apexone Microelectronics Ltd., Shanghai (CN)

( * ) Notice: Subject to any disclaimer, the term of this patent is extended or adjusted under 35 U.S.C. 154(b) by 343 days.

(21) Appl. No.: 11/720,828

(22) PCT Filed: Apr. 27, 2006

(86) PCT No.: PCT/CN2006/000816
§ 371 (c)(1),
(2), (4) Date: Jun. 4, 2007

(87) PCT Pub. No.: WO2007/124613
PCT Pub. Date: Nov. 8, 2007

(65) Prior Publication Data
US 2010/0067746 A1    Mar. 18, 2010

(51) Int. Cl.
*G06K 9/00* (2006.01)
(52) U.S. Cl. .................. 382/107; 382/218; 382/278
(58) Field of Classification Search .................. 382/103, 382/107, 218, 278, 295; 348/699
See application file for complete search history.

(56) References Cited

U.S. PATENT DOCUMENTS

2005/0200600 A1 * 9/2005 Lee ............................ 345/156
2006/0269155 A1 * 11/2006 Tener et al. .................. 382/243

FOREIGN PATENT DOCUMENTS

CN    1667565 A  *  9/2005
CN    1716284 A  *  1/2006

* cited by examiner

*Primary Examiner* — Andrew W Johns
(74) *Attorney, Agent, or Firm* — Finnegan, Henderson, Farabow, Garrett & Dunner, L.L.P.

(57) ABSTRACT

A motion sensing process senses a mouse moving relative to a surface by taking a reference image and a sample image of the surface. The process shifts the reference image to neighboring pixel positions arranged in certain patterns and compares the sample image with the reference image at its original pixel position at the shifted pixel positions. A motion vector describing a displacement of the object with respect to the surface is generated from such comparisons. In one embodiment, the pattern includes the original pixel position and neighboring pixel position arranged five rows and five columns with the total number of the pixel positions less than twenty five. In another embodiment, the process selects one of four elongated patterns based on the orientation of a predicted motion vector. In yet another specific embodiment, the process selects one of eight directional patterns based on the direction of the predicted motion vector.

20 Claims, 6 Drawing Sheets

OPTICAL MOTION SENSING PROCESS

FIELD OF THE INVENTION

The present invention generally relates to motion sensing, more particularly, to optical motion sensing is such applications as computer pointing devices.

BACKGROUND OF THE INVENTION

A computer pointing device, generally referred to as a mouse, is one of the most commonly used devices for computer interface. As a user moves the mouse on a surface, a motion sensing mechanism in the mouse senses the motion and moves a cursor on the computer display accordingly. There are generally two types of motion sensing mechanisms, mechanical sensing and optical sensing.

A mechanical sensing mechanism generally includes a tracking ball at the bottom of the mouse and mechanically coupled to two tracking wheels. When the mouse moves on a surface, e.g., a mouse pad or desk surface, the rolling ball rotates. The tracking wheels convert the rotation of the rolling ball into electrical signals to control the movement of a cursor on the computer display. A mechanical sensing mouse is susceptible to damage and performance deterioration in resulted from dirt accumulation and/or wear.

An optical sensing mechanism generally includes a photo emitting device, e.g., a light emitting diode and an array of photo detectors. The array of photo detectors detects the features on a surface, e.g., that of a mouse pad or a desk. As the user moves the mouse over the surface, the feature moves relative the array of photo detectors. In one approach, the photo detectors are arranged in two orthogonal linear arrays, each having the width of one pixel. A state machine compares the output signals of the photo detectors in the tow linear arrays and to sense the motion of the mouse relative the surface. This linear array approach is sensitive to the speed and pattern of mouse motion. Its performance and reliability are unsatisfactory compared with conventional mechanical sensing mechanism.

In another approach, the photo detectors are arranged in a two dimensional array. Motion sensing or tracking is achieved by calculating the correlation between a newly captured sample image and a previously captured reference image to ascertain the direction and amount of movement. Specifically, the tracking process computes nine correlation functions of the sample image with the reference image, one with the sample image at its original position and the other eight with the sample imaged shifted one pixel in eight directions. The nine pixel points form a three by three square array centered at the original pixel. This two dimensional array approaches is also sensitive to the speed and pattern of mouse motion.

An improvement of the motion tracking performance can be achieved by including twenty-five pixel points in the correlation calculation. The twenty-five pixel points include one original pixel, eight nearest neighbors and sixteen second nearest neighbors of the original pixel. They form a square array of five pixels by five pixels centered around the original pixel. The optical motion tracking with the twenty-five pixel square array correlation provides improved performance and reliability compared with the orthogonal linear array and the nine pixel motion tracking processes. However, the correlation calculation process for the twenty-five pixel square array is computational intensive. It consumes significant computational power. Therefore, its implementation is complicated and power inefficient.

Accordingly, it would be advantageous to have a reliable optical motion sensing or tracking process. It is desirable for the motion sensing process to be able to accurately tracking the motion direction and distance. It is also desirable for the motion sensing process to be fast, which is beneficial in reducing the delay and improving the performance of an optical mouse. Furthermore, it is desirable for the motion sensing process to be computational power efficient. It is of further advantage if an device, e.g., an optical computer pointing device, implanting the optical sensing process is simple, power efficient, and inexpensive.

DETAILED DESCRIPTION OF VARIOUS EMBODIMENTS

Various embodiments of the present invention are described herein below with reference to the figures, in which elements of similar structures or functions are represented by like reference numerals throughout the figures. It should be noted that the figures are only intended to facilitate the description of the preferred embodiments of the present invention. They are not intended as an exhaustive description of the present invention or as a limitation on the scope of the present invention. In addition, the figures are not necessarily drawn to scale.

Figure 1:
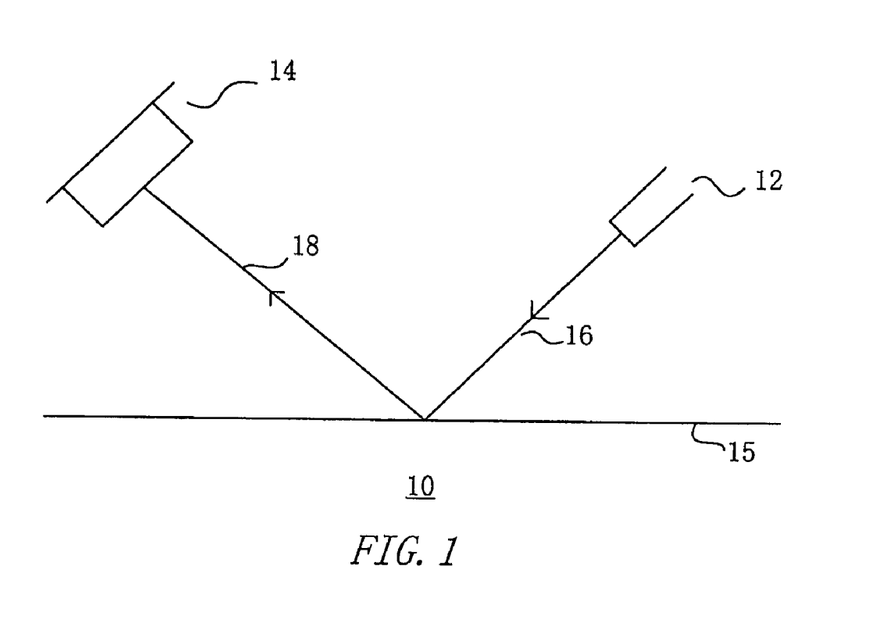
FIG. 1 is a schematic diagram illustrating an optical motion tracking system in accordance with an embodiment of the present invention.

FIG. 1 is a functional schematic diagram illustrating an optical motion sensing or tracking system 10 in accordance with an embodiment of the present invention. By way of example, motion tracing system 10 functions as an optical motion tracking system in a computer pointing device commonly referred to as a mouse. Motion tracking system 10 includes a light emitting device 12 and a light sensing device 14. In accordance with a preferred embodiment of the present invention, light sensing device 14 includes a plurality of photo detectors arranged in a two-dimensional array. The photo detector array is electrically coupled to a signal processing or computational circuit for processing the signals from the photo detectors. In operation, light emitting device 12 illuminates a surface 15, e.g., that of a mouse pad, a desk top, etc., with an incident light beam 16. Photo sensing device 14 senses a light beam 18 reflected light from surface 15. Reflected light beam 18 contains information about the surface features, e.g., color, texture, contrast, brightness, smoothness, etc., of surface 15. When a user moves the mouse relative to surface 15, the information in reflected light beam 18 varies. The computational circuit in photo sensing device 14 computes the motion of the mouse relative to surface 15 from the information variation in reflected light beam 18. Based on the computed mouse motion, computational circuit transmits a control signal to a host computer for controlling a cursor on the computer display.

It should be noted that FIG. 1 only schematically illustrates the functional features of motion tracking system 10 and does not include all element therein. For example, motion tracking system 10 may include one or more lenses in the light paths from light emitting device 12 to surface 15 and from surface 15 to light sensing device 14. There may be an aperture window at the bottom of the mouse near surface 15. In accordance with a preferred embodiment of the present invention, light emitting device 12 includes a power efficient light source, e.g., a light emitting diode. In addition, the photo detector array and the signal processing circuit in photo sensing device 14 may be fabricated on a single chip or on separate chips. In the optical mouse applications, all components of motion tracking system 10 are preferably enclosed in an outer casing shaped for convenient handling. The mouse may communicate with the host computer with or without wires. The wireless communication modes include, but are not limited to, radio frequency (RF) and infrared (IR).

Figure 2:
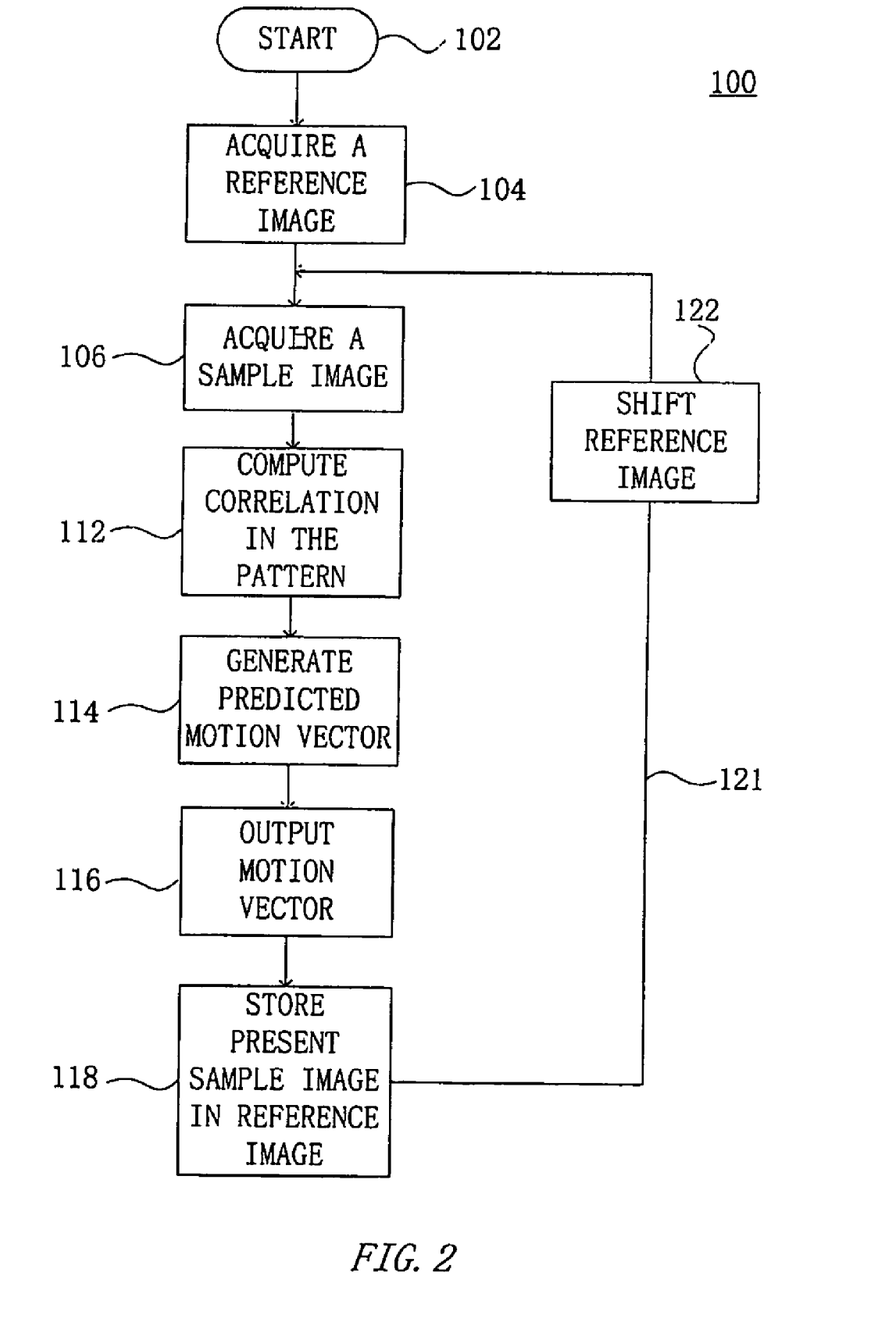
FIG. 2 is a flow chart illustrating an optical motion tracking process in accordance with an embodiment of the present invention.

FIG. 2 is a flow chart illustrating an optical motion tracking process 100 in accordance with an embodiment of the present invention. By way of example, optical motion tracking process 100 can perform on optical motion sensing or tracking system 10 shown in FIG. 1. In accordance with an embodiment of the present invention, motion tracking process 100 tracks the motion of a mouse with respect to a surface and sends a control signal to the host computer to move the cursor on the computer display.

In accordance with a preferred embodiment of the present invention, optical motion tracking process 100 tracks the motion of a mouse with respect to a surface by calculating the correlation relations between the images of the surface at different times. Specifically, optical motion tracking process 100 computes the correlation between a sample image and a reference image of the surface after shifting the sample image or the reference image to neighboring pixel points. In accordance with an embodiment of the present invention, motion tracking process 100 predicts a direction of the mouse motion and selects a pattern of the neighboring pixel points to which the sample image or the reference image is shifted for correlation calculation based on the prediction. In accordance with another embodiment of the present invention, motion tracking process 100 shifts the sample image or the reference image for correlation calculation to the neighboring pixel points in an isotropic pattern.

After initialization in a start step 102, motion tracking process 100 first acquires) an image, referred to as a reference image, in a step 104. The reference image is comprised of the signals from a two-dimensional array of photo detectors and generally contains information about the feature on surface 15 shown in FIG. 1. In accordance with the present invention, the reference image is stored in a reference image memory unit in motion tracking system 10 (not shown in FIG. 1).

After delaying a predetermined time interval following taking the reference image in step 104, process 100 takes another image, referred to as a sample image, in a step 106. Like the reference image, the sample image is comprised of the signals from a two-dimensional array of photo detectors and contains information about the feature on surface 15 shown in FIG. 1, but at a different time. If the mouse moves during the time interval between step 104 and step 106, the sample image will shift with respect to the reference image. In accordance with the present invention, the sample image is stored in a sample image memory unit in motion tracking system 10 (not shown in FIG. 1).

In a next step 112, motion tracking process 100 computes the correlation between the sample image taken in step 106 and the reference image. In accordance with an embodiment of the present invention, process 100 computes the correlation by comparing sample image with the reference image at its original pixel point and after shifting the reference image to various neighboring pixel points. The original reference image and the shifted images form a plurality of image frames. By computing the correlation between the sample image and the plurality of image frames, process 100 calculates a motion vector MV to indicate the direction and magnitude of the displacement of the sample image with respect to the reference image.

Figure 3:
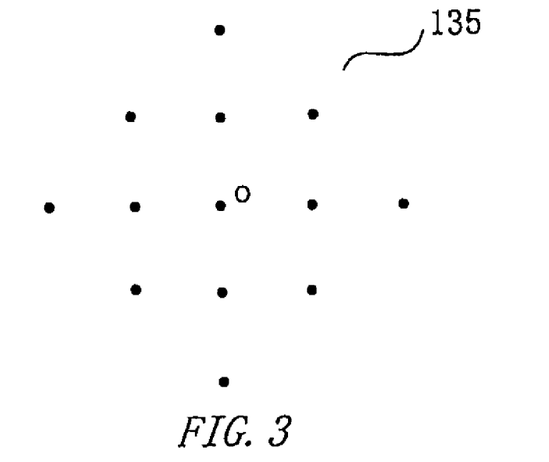
FIG. 3 is a schematic diagram illustrating an isotropic image frame shifting pattern in accordance with a specific embodiment of the present invention.
Figure 4:
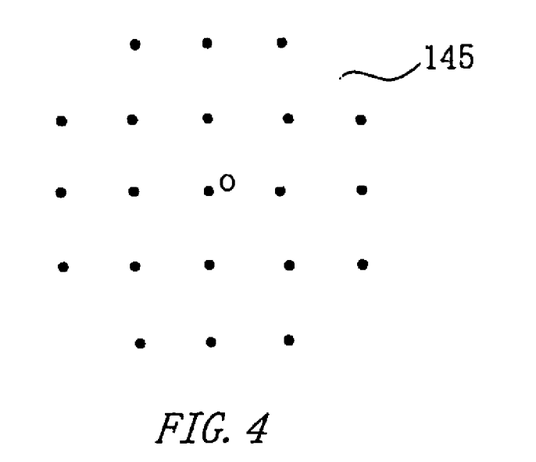
FIG. 4 is a schematic diagram illustrating an isotropic image frame shifting pattern in accordance with another specific embodiment of the present invention.

In accordance with a specific embodiment, step 112 in process 100 sequentially compares the sample image with the reference image at its original pixel point and after shifting the reference image to twelve neighboring pixel points in a diamond pattern 135 shown in FIG. 3. In accordance with another specific embodiment, step 112 in process 100 sequentially compares the sample image with the reference image at its original pixel point and after shifting the reference image to twenty neighboring pixel points in a round pattern 145 shown in FIG. 4. As shown in FIGS. 3 and 4, the image frames in diamond pattern 135 and round pattern 145 are isotropic. Shifting the reference image to the neighboring pixel points in diamond pattern 135 or round pattern 145 in accordance with the present invention provides reliable motion tracking without consuming excessive computation power. Simulation results indicate that the diamond or round pattern reference image shifting is capable of motion tracking with a reliability significantly higher than that of the nine point square pattern image frame and comparable to that of the twenty-five point square pattern image frame. However, it requires significantly less computation power than the twenty-five point square pattern shifting frame.

Figure 5:
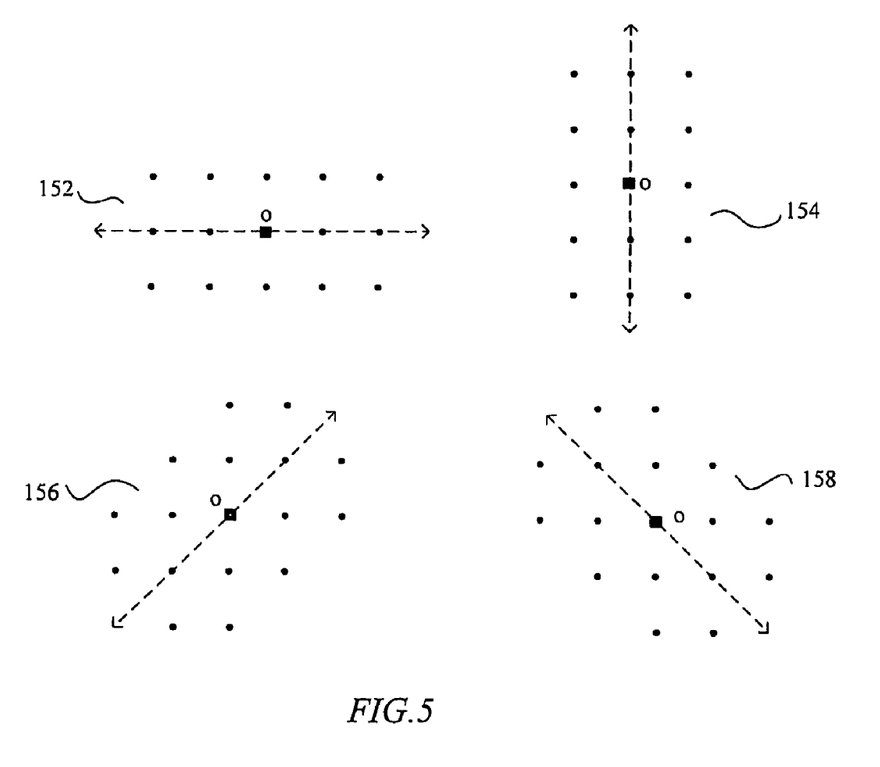
FIG. 5 is a schematic diagram illustrating four anisotropic image frame shifting patterns in accordance with yet another specific embodiment of the present invention.

In accordance with yet another specific embodiment of the present invention, step 112 in process 100 sequentially compares the sample image with the reference image at its original pixel point and after shifting the reference image to fourteen neighboring pixel points in one of two rectangular patterns 152 and 154, or sixteen pixel points in one of two tilted patterns 156 and 158 shown in FIG. 5. As shown in FIG. 5, the image frames in each of rectangular patterns 152 and 154 have axes of symmetry substantially perpendicular to each other, and the image frames in each of tilted patterns 156 and 158 have axes of symmetry substantially perpendicular to each other and at an angle of about forty-five degrees (45°) with respect to those of rectangular patterns 152 and 154. Because of their anisotropic nature, process 100 preferably selects which of the four anisotropic patterns for reference image shifting depending on a predicted direction of the mouse motion. A pattern selection process in accordance with an embodiment of the present invention is described herein below with reference to FIG. 6. Shifting the reference image to the neighboring pixel points in elongated and anisotropic patterns 152, 154, 156, and 158 shown in FIG. 5 in accordance with the present invention provides a highly reliable and efficient motion tracking mechanism.

Next in a step 114, process 100 predicts the motion of the mouse for step 112 of correlation calculation in a subsequent cycle of process 100. In accordance with a specific embodiment of the present invention, process 100 calculates a predicted motion vector as a linear combination of previously calculated motion vectors. For example, with PMV denoting the predicted motion vector, $MV_1$ denoting the motion vectors calculated in step 112 of process 100 in the current and the previous cycles, and $a_1$ denoting the linear combination coefficients, the predicted motion vector PMV in accordance with a preferred embodiment of the present invention is calculated as $$PMV = \sum_{i=0}^{N} a_i MV_i \text{ with } \sum_{i=0}^{N} a_i = 1. \quad (1)$$

In equation (1), the index i is equal to 0 in the current cycle and 1 in the immediately previous cycle, and so on. In other words, $MV_0$ represents the motion vector calculated in step 112 of the current cycle, $MV_1$ represents the motion vector calculated in step 112 in the immediately previous cycle, and $MV_2$ represents the motion vector calculated in step 112 in the a cycle before that for $MV_1$.

Upon initiation and before going through the first cycle, process 100 initializes motion vectors $MV_1$ to a set of predetermined values in accordance with a preferred embodiment of the present invention. In a specific embodiment, the initial values for the motion vectors $MV_1$ are set to be zero.

The coefficients $a_i$ are also referred to as weighing factors and can take various values. In accordance with a preferred embodiment of the present invention, the coefficients of linear combination $a_i$ are weighed toward the motion vectors calculated in the current or immediately previous cycle. In other words, the motion vectors calculated in the current and/or immediately previous cycles carry more weight in calculating the predicted motion vector. By way of example, the coefficients $a_i$ take the following values in a specific embodiment of the present invention:

$$a_i = \begin{cases} 0.7 & (i=0) \\ 0.3 & (i=1) \\ 0 & (i>1) \end{cases} \quad (2)$$

In accordance with a preferred embodiment of the present invention, setting the coefficients $a_i$ equal to zero for $i>1$ requires only two memory units for storing the calculated motion vectors and can provide sufficiently accurate predicted motion vector for identifying the mouse motion through correlation calculation.

It should be understood that Equations (1) and (2) above represent formulae for calculating predicted motion vectors in accordance with various embodiments of the present invention and they are not intended as limitations on the scope of the present invention. For example, the coefficients of linear combination a, are not limited to having the values shown in Equation (2) and can involve more than two most recently calculated motion vectors. In addition, step 114 in process 100 is not limited to calculate the predicted motion vector as a linear combination of the motion vectors of the current and previous cycles. Furthermore, step 114 of calculating the predicted motion vector is optional in motion tracking process 100 in accordance with the present invention.

Next in a step 116, motion tracking process 100 outputs the motion vector to the host computer to control the cursor on its display. In accordance with one embodiment of the present invention, process 100 outputs the motion vector to the host computer in every cycle. In accordance with another embodiment, process 100 accumulates the motion vectors in motion tracing system 10 and outputs the sum of the accumulated motion vectors to the host computer after a predetermined number cycles or a predetermined time interval. Outputting the sum of the accumulated motion vectors over a plural number of cycles to the host computer may be beneficial in reducing the data transmission load between the mouse and the host computer and smoothing the cursor motion on the computer display. In accordance with yet another embodiment, process 100 outputs the sum of the motion vector calculated in step 112 and the predicted motion vector calculated in step 114 to the host computer. In this embodiment, the output signal to the host computer anticipates the mouse motion.

In a step 118, process 100 updates the data in reference image memory for the next cycle. The updated data serves as the new reference image for the next cycle. In accordance with a preferred embodiment of the present invention, process 100 updates the reference image by inputting the sample image to the reference image memory unit.

After step 118, process 100 returns to step 106 for the next cycle through a path 121. As shown in FIG. 2, process 100 includes a step 122 of shifting the reference image in path 121. This optional step adds the predicted motion vector calculated in step 114 to the reference image stored in the memory. Under certain conditions, e.g., when the mouse is moving at a high speed, the sample image in a cycle may fall outside the correlation calculation patterns, e.g., the patterns shown in FIGS. 3, 4, and 5, surrounding the new updated reference image obtained in step 118 of the previous cycle. Motion tracking process 100 may fail to calculate the motion vector in step 112 when the sample image is not within the image frame of the correlation calculation pattern. Step 122 of shifting the reference image by the predicted motion vector significantly reduces or substantially eliminates such circumstances even when the mouse is moving at a high speed. Increasing the measuring cycle speed of process 100 may ensure that the sample image is within the neighborhood of the reference image updated in the previous cycle and eliminate the need for shifting the updated reference image in step 122. However, increasing the cycle speed may increase the computation power requirement, power consumption of process 100. Therefore, optional step 122 of shifting the updated reference image is beneficial in improving the motion tracking performance reliability without increasing the power consumption or circuit complexity of motion tracking system 10.

Figure 6:
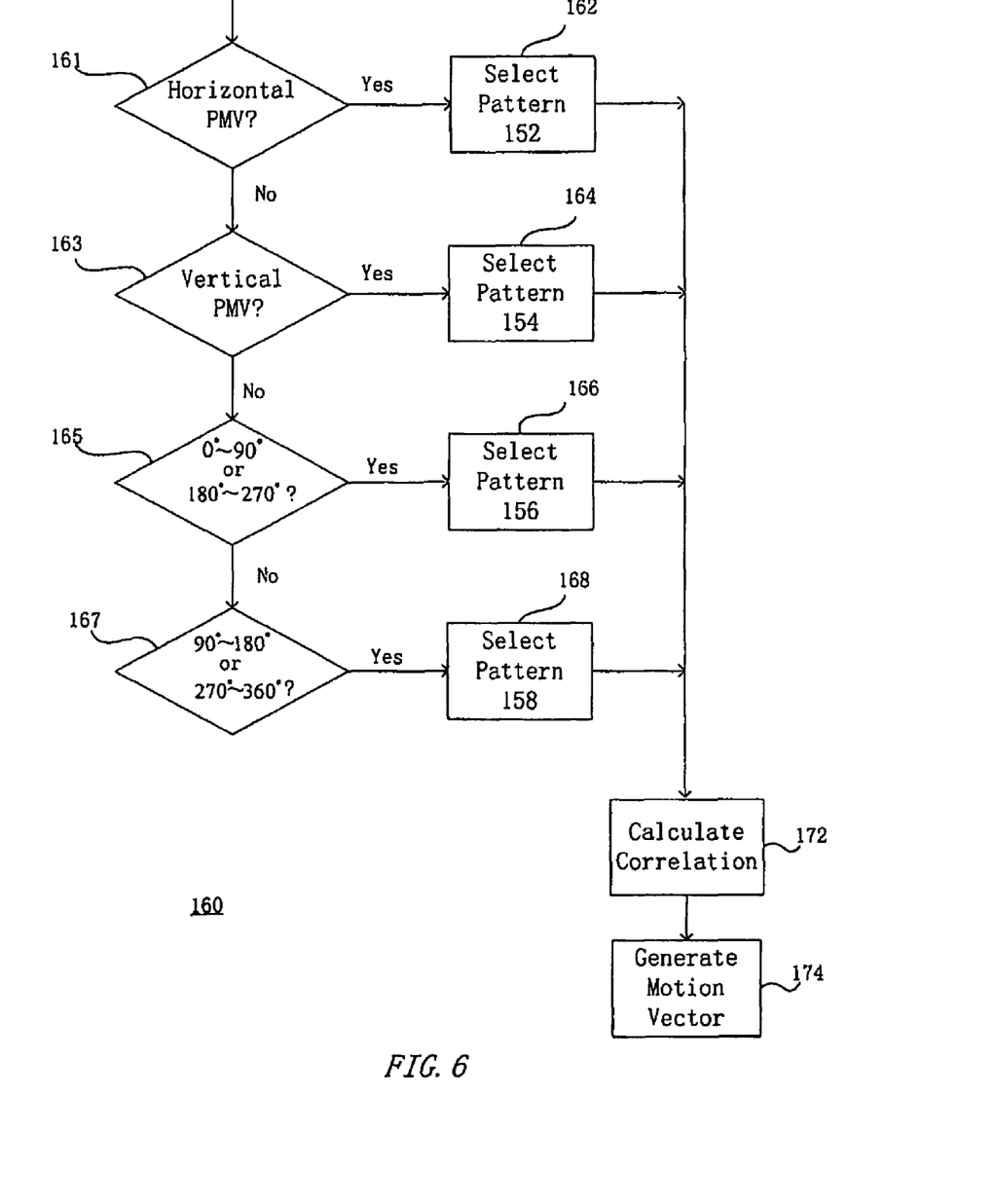
FIG. 6 is a flow chart illustrating a pattern selection process in accordance with an embodiment of the present invention.

FIG. 6 is a flowchart of a correlation calculation process 160 in accordance with an embodiment of the present invention. In accordance with a preferred embodiment of the present invention, process 160 selects one of four anisotropic patterns shown in FIG. 5 of image shifting for correlation calculation so that an axis of symmetry in the selected pattern is generally along the direction of the predicted motion vector. Process 160 is therefore also referred to as a pattern selection process or a image frame selection process. By way of example, process 160 can function as step 112 in motion tracking process 100 described herein above and shown in FIG. 2. However, this is not intended as a limitation on the scope of the present invention. Process 160 may function in other processes that include calculating the correlation between two positions or configurations.

Referring to FIGS. 2 and 6, correlation calculation process 160, in a step 161, checks the orientation of the predicted motion vector calculated in step 114 of motion tracking process 100. If the predicted motion vector is substantially horizontal, i.e., its direction is at an angle substantially equal to zero degree (0°) or 180° with respect to a predetermined reference direction, process 160 proceeds to a step 162 in which horizontal rectangular pattern 152 shown in FIG. 5 is selected. Otherwise, process 160 proceeds to a step 163, in which process 160 checks whether the orientation of the predicted motion vector is substantially vertical, i.e., its direction is at an angle substantially equal to 90° or 270° with respect to the predetermined reference direction. If yes, process 160 proceeds to a step 164 and selects vertical rectangular pattern 154 shown in FIG. 5. Otherwise, process 160 proceeds to a step 165. If the predicted motion vector has an angle between 0° and 90° or between 180° and 270°, process 160 selects tilted elongated pattern 156 shown in FIG. 5 in a step 166. Otherwise, process 160 proceeds to a step 167 to check whether the predicted motion vector has an angle between 90° and 180° or between 270° and 360° with respect to the predetermined reference direction. If yes, process 160 proceeds to a step 168 to select tilted elongated pattern 158 shown in FIG. 5.

After selecting one of four anisotropic patterns 152, 154, 156, and 158, process 160 calculates the correlation functions between the sample image and the reference image at its original position (indicated by a reference symbol O in FIG. 5) and at the shifted pixel positions in a step 172 and calculates the motion vector in a step 174. Afterwards, correlation calculation process 160 proceeds to step 114 of motion tracking process 100.

It should be understood that correlation calculation process 160 is not limited to that described herein above. For example, step 167 is optional in accordance with the present invention. In addition steps 161, 163, 165, and 167 can have different criteria of checking the orientation of the predicted motion vector. For example, the criterion for the horizontal predicted motion vector can be that the angle between the predicted motion vector and the predetermined direction is in the range of 0°±20° or 180°±20° in step 161. Likewise criterion for the vertical predicted motion vector can be that the angle between the predicted motion vector and the predetermined direction is in the range of 90°±120° or 270°±120° in step 163. Correspondingly, the criterion in step 165 can be that the angle between the predicted motion vector and the predetermined direction is in the range of 45°±25° or 225°±25°, and the criterion in step 167 can be that the angle between the predicted motion vector and the predetermined direction is in the range of 135°±25° or 315°±25°.

Figure 7:
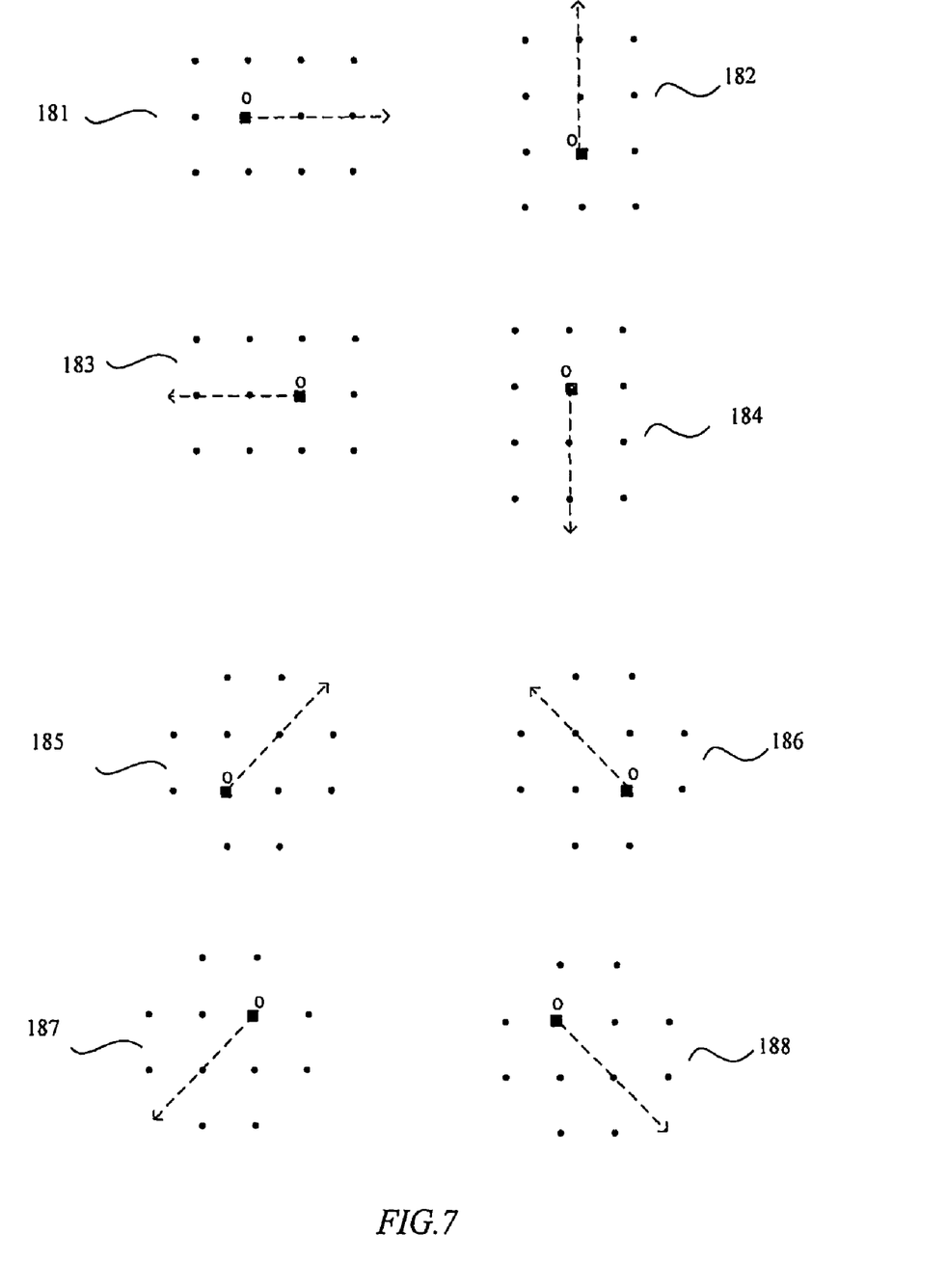
FIG. 7 is a schematic diagram illustrating eight directional image frame shifting patterns in accordance with yet another specific embodiment of the present invention.

FIG. 7 illustrates eight directional image frame shifting patterns 181, 182, 183, 184, 185, 186, 187, and 188 in accordance with yet another specific embodiment of the present invention. Each of image shifting patterns 181, 182, 183, 184, 185, 186, 187, and 188 includes the original pixel point and eleven shifted pixel points. Image shifting patterns 181 and 183 have their axes of symmetry parallel to that of rectangular pattern 152 shown in FIG. 5 and correspond to motion in the horizontally right and horizontally left directions, respectively. Image shifting patterns 182 and 184 have their axes of symmetry parallel to that of rectangular pattern 154 shown in FIG. 5 and correspond to motion in the vertically up and vertically down directions, respectively. Image shifting patterns 185 and 187 have their axes of symmetry parallel to that of tilted pattern 156 shown in FIG. 5 and correspond to motion in the up-right and down-left directions, respectively. Image shifting patterns 186 and 188 have their axes of symmetry parallel to that of tilted pattern 158 shown in FIG. 5 and correspond to motion in the up-left and down-right directions, respectively. Shifting patterns 181, 182, 183, 184, 185, 185, 187, and 188 are anisotropic and direction specific. They are also referred to as directional patterns.

A pattern selection process for selecting one of the eight patters shown in FIG. 7 for correlation calculation is similar to process 160 described herein above with reference to FIG. 6. However, it preferably includes eight direction criteria corresponding to the eight directional patterns. Preferably, the selected pattern has an axis of symmetry generally coincides with the direction of the predicted motion vector and includes more pixel points in front of the original pixel point than behind the original pixel point. By way of example, the following criteria are used in the pattern selection process in accordance with a specific embodiment of the present invention. A criterion corresponding to horizontally right pattern 181 is the predicted motion vector having an angle with respect to the predetermined direction in a range of 0°±25°. A criterion corresponding to vertically up pattern 182 is the predicted motion vector having an angle with respect to the predetermined direction in a range of 90°±25°. A criterion corresponding to horizontally left pattern 183 is the predicted motion vector having an angle with respect to the predetermined direction in a range of 180°±25°. A criterion corresponding to vertically down pattern 184 is the predicted motion vector having an angle with respect to the predetermined direction in a range of 270°±25°. A criterion corresponding to up-right pattern 185 is an angle between the predicted motion vector and the predetermined direction being in a range of 45°±20°. A criterion corresponding to up-left pattern 186 is an angle between the predicted motion vector and the predetermined direction being in a range of 135°±20°. A criterion corresponding to down-left pattern 187 is an angle between the predicted motion vector and the predetermined direction being in a range of 225°±20°. Likewise, a criterion corresponding to down-right pattern 188 is an angle between the predicted motion vector and the predetermined direction being in a range of 315°±20°.

In accordance with a preferred embodiment of the present invention, correlation calculation for each on the eight directional image shift patterns includes only twelve comparisons between the sample image and the reference image, one corresponding to the original pixel point and eleven corresponding to the shifted pixel points as shown in FIG. 7. Therefore, it is computation power efficient. The patterns have more pixel points in the motion direction than in the direction perpendicular or opposite to the motion direction. In other words, the patterns have more pixel points in front of the original pixel point in the motion direction than sideways or behind the original pixel point. These pattern arrangements provide a reliable motion traction of the mouse motion with high efficiency.

By now it should be appreciated that a reliable and efficient optical motion sensing or tracking process has been provided. In accordance with a preferred embodiment of the present invention, the motion tracking process senses the motion of an object, e.g., a optical mouse, relative to a surface, e.g., a mouse pad, by taking two images, referred to as a reference image and a sample image, of the surface at a time interval from each other. The process shifts one image, e.g., the reference image, to neighboring pixel positions arranged in certain patterns. The motion tracking process then compares the other image, e.g., the sample image, with the reference image at its original pixel position at the shifted pixel positions to calculating correlate functions between the two images. A motion vector describing a displacement of the object over the time interval is generated from the correlation functions. In a specific embodiment of the present invention, the pattern includes the original pixel position and twelve neighboring pixel position arranged five rows and five columns in the shape resembling a diamond. In another specific embodiment of the present invention, the pattern includes the original pixel position and twenty neighboring pixel position arranged five rows and five columns in the shape resembling a round disk. In yet another specific embodiment of the present invention, there are actually four elongated and anisotropic patterns. The process selects one of the four patterns based on the orientation of a predicted motion vector. In yet another specific embodiment of the present invention, there are actually eight directional patterns. The process selects one of the eight directional patterns based on the direction of a predicted motion vector. These image shifting patterns provide fast, accurate, and reliable motion sensing. They are computation power efficient and energy efficient. In addition, they are simple and easy to implement via software programming.

While specific embodiments of the present invention have been described herein above, they are not intended as limitations on the scope of the invention. The present invention encompasses those modifications and variations of the described embodiments that are obvious to those skilled in the art. For example, the motion tracking process is not limited to shifting the reference image when calculating the correlation functions. The present invention also encompasses a process of shifting the sample image to different pixel points in the patterns and comparing the shifted sample images with the reference image when calculating the motion vector. Furthermore, the applications of motion traction process are not limited to optical mouse or computer pointing device. A motion traction process in accordance with the present invention is applicable in many other fields with the need of sensing motion, e.g., television remote control, robots, etc.

The invention claimed is:

1. A method for sensing motion of an object with respect to a surface, comprising:
    taking a reference image of the surface via a photo detector attached to the object and having a plurality of pixels arranged in a two dimensional array;
    taking a sample image of the surface at a time interval after taking the reference image;
    comparing the sample image and the reference image to generate a correlation function;
    shifting one of the reference image and the sample image to a plurality of pixels in an anisotropic pattern surrounding an original pixel thereof to generate a plurality of shifted images;
    comparing another one of the sample image and the reference image that is not shifted with the plurality of shifted images to generate a plurality of shifted correlation functions; and
    calculating a motion vector representing a displacement of the object with respect to the surface during the time interval from the correlation function and the plurality of the shifted correlation functions.

2. The method of claim 1, further comprising outputting the motion vector to a host computer to control a cursor on a display thereof.

3. The method of claim 1, further comprising:
    updating data for the reference image with the sample image;
    taking a new image as the sample image; and
    calculating a second motion vector representing a second displacement of the object with respect to the surface.

4. The method of claim 3, further comprising outputting a sum of the motion vector and the second motion vector.

5. The method of claim 3, further comprising generating a predicted motion vector from the motion vector and the second motion vector.

6. The method of claim 5, further comprising adding the predicted motion vector to the reference image after updating data for the reference image.

7. The method of claim 5, wherein generating a predicted motion vector includes generating the predicted motion vector as a linear combination of the motion vector and the second motion vector.

8. The method of claim 5, shifting one of the sample image and the reference image including selectively shifting the one of the sample image and the reference image to the plurality of pixels surrounding the original pixel thereof in one of four anisotropic patterns, wherein:
    a first anisotropic pattern has a first axis of symmetry;
    a second anisotropic pattern has a second axis of symmetry substantially perpendicular to the first axis;
    a third anisotropic pattern has a third axis of symmetry at an angle substantially equal to forty-five degrees with respect to the first axis; and
    a fourth anisotropic pattern has a fourth axis of substantially perpendicular to the third axis.

9. The method of claim 8, shifting one of the sample image and the reference image including selectively shifting the one of the sample image and the reference image to the plurality of pixels surrounding the original pixel thereof in one of the four anisotropic patterns in response to an orientation of the predicted motion vector.

10. The method of claim 8, shifting one of the sample image and the reference image further including:
    selecting the first anisotropic pattern in response to the predicted motion vector substantially parallel or anti parallel to a predetermined direction;
    selecting the second anisotropic pattern in response to the predicted motion vector substantially perpendicular to the predetermined direction;
    selecting the third anisotropic pattern in response to the predicted motion vector in the first or third quadrant with respect to the predetermined direction; and
    selecting the fourth anisotropic pattern in response to the predicted motion vector in the second or fourth quadrant with respect to the predetermined direction.

11. The method of claim 8, selectively shifting the one of the sample image and the reference image to the plurality of pixels surrounding the original pixel thereof in one of four anisotropic patterns including:
    arranging the original pixel and fourteen surrounding pixels into the first anisotropic pattern in three rows and five columns with the original pixel in the second row and the third column;
    arranging the original pixel and fourteen surrounding pixels into the second anisotropic pattern in five rows and three columns with the original pixel in the third row and the second column;
    arranging the original pixel and sixteen surrounding pixels into the third anisotropic pattern in five rows, wherein:
        a first row includes first and second pixels;
        a second row includes third, fourth, fifth, and sixth pixels with the fourth pixel aligned with the first pixel;
        a third row includes seventh, eighth, the original, ninth, and tenth pixels with the original pixel aligned with the first pixel;
        a fourth row includes eleventh, twelfth, thirteenth, and fourteenth pixels with the thirteen pixel aligned with the first pixel; and
        a fifth row includes fifteenth and sixteenth pixels with the sixteenth pixel aligned with the first pixel; and
    arranging the original pixel and sixteen surrounding pixels into the fourth anisotropic pattern in five rows, wherein:

a first row includes first and second pixels;

a second row includes third, fourth, fifth, and sixth pixels with the fifth pixel aligned with the second pixel;

a third row includes seventh, eighth, the original, ninth, and tenth pixels with the original pixel aligned with the second pixel;

a fourth row includes eleventh, twelfth, thirteenth, and fourteenth pixels with the twelfth pixel aligned with the second pixel; and a fifth row includes fifteenth and sixteenth pixels with the fifteenth pixel aligned with the second pixel.

12. The method of claim 5, shifting one of the sample image and the reference image including selectively shifting the one of the sample image and the reference image to the plurality of pixels surrounding the original pixel thereof in one of eight directional patterns corresponding to eight directions with:

a first direction;

a second direction substantially perpendicular to the first direction;

a third direction substantially opposite to the first direction;

a fourth direction substantially opposite to the second direction;

a fifth direction having an angle of approximately forty-five degrees with respect to the first direction;

a sixth direction substantially perpendicular to the fifth direction;

a seventh direction substantially opposite to the fifth direction; and an eighth direction substantially opposite to the sixth direction.

13. The method of claim 12, shifting one of the sample image and the reference image further including:

measuring an angle between the predicted motion vector and the first direction;

selecting a first directional pattern in response to the angle in a range $0°±25°$;

selecting a second directional pattern in response to the angle in a range $90°±25°$;

selecting a third directional pattern in response to the angle in a range $180°±25°$;

selecting a fourth directional pattern in response to the angle in a range $270°±25°$;

selecting a fifth directional pattern in response to the angle being $45°±20°$;

selecting a sixth directional pattern in response to the angle being $135°±20°$;

selecting a seventh directional pattern in response to the angle being $225°±20°$; and selecting an eighth directional pattern in response to the angle being $315°±20°$.

14. The of claim 12, selectively shifting the one of the image and the reference image to the plurality of pixels surrounding the original pixel thereof in one of eight directional patterns including:

arranging the original pixel and eleven surrounding pixels into a first directional pattern in three rows and four columns with the original pixel in the second row and the second column;

arranging the original pixel and eleven surrounding pixels into a second directional pattern in four rows and three columns with the original pixel in the third row and the second column;

arranging the original pixel and eleven surrounding pixels into a third directional pattern in three rows and four columns with the original pixel in the second row and the third column;

arranging the original pixel and eleven surrounding pixels into a fourth directional pattern in four rows and three columns with the original pixel in the second row and the second column;

arranging the original pixel and eleven surrounding pixels into a fifth directional pattern in four rows, wherein a first row includes first and second pixels, a second row includes third, fourth, fifth, and sixth pixels with the fourth pixel aligned with the first pixel, a third row includes seventh, the original, eighth and ninth pixels with the original pixel aligned with the first pixel, and a fourth row includes tenth and eleventh pixels with the tenth pixel aligned with the first pixel;

arranging the original pixel and eleven surrounding pixels into a sixth directional pattern in four rows, wherein a first row includes first and second pixels, a second row includes third, fourth, fifth, and sixth pixels with the fifth pixel aligned with the second pixel, a third row includes seventh, eighth, the original, and ninth pixels with the original pixel aligned with the second pixel, and a fourth row includes tenth and eleventh pixels with the eleventh pixel aligned with the second pixel;

arranging the original pixel and eleven surrounding pixels into a seventh directional pattern in four rows, wherein a first row includes first and second pixels, a second row includes third, fourth, the original, and fifth pixels with the original pixel aligned with the second pixel, a third row includes sixth, seventh, eighth, and ninth pixels with the eighth pixel aligned with the second pixel, and a fourth row includes tenth and eleventh pixels with the eleventh pixels aligned with the second pixel; and arranging the original pixel and eleven surrounding pixels into an eighth directional pattern in four rows, wherein a first row includes first and second pixels, a second row includes third, the original, fourth, and fifth pixels with the original pixel aligned with the first pixel, a third row includes sixth, seventh, eighth, and ninth pixels with the seventh pixel aligned with the first pixel, and a fourth row includes tenth and eleventh pixels with the tenth pixel aligned with the first pixel.

15. An optical motion sensing process for tracking motion of an object relative a surface, comprising the steps of:

taking a first image and a second image of the surface via a photo sensing array at a time interval from each other;

generating a plurality of image frames from the first image and by shifting the first image to a plurality of neighboring pixels arranged in five rows, a number of the plurality of image frames being less than twenty-five;

generating a plurality of correlation functions by comparing the second image with the plurality of image frames; and generating a motion vector indicating a displacement of the object relative to the surface during the time interval from the plurality of correlation functions.

16. The optical motion sensing process of claim 15, the step of generating a plurality of image frames further including generating thirteen image frames comprised of the original pixel and twelve neighboring pixels in five rows, wherein:

a first row includes a first neighboring pixel aligned to the original pixel;

a second row includes second, third, and fourth neighboring pixels with the third neighboring pixel aligned to the original pixel;

a third row includes fifth and sixth neighboring pixels, the original pixel, and seventh and eighth neighboring pixels;

a fourth row includes ninth, tenth, and eleventh neighboring pixels with the tenth neighboring pixel aligned to the original pixel; and a fifth row includes a twelfth neighboring pixel aligned to the original pixel.

17. The optical motion sensing process of claim 15, the step of generating a plurality of image frames further including generating twenty-one image frames comprised of the original pixel and twenty surrounding pixels in five rows, wherein:

a first row includes first, second, and third pixels with the second pixel aligned to the original pixel;

a second row includes fourth, fifth, sixth, seventh, and eighth pixels with the sixth pixel aligned to the original pixel;

a third row includes ninth, tenth, the original, eleventh, and twelfth pixels;

a fourth row includes thirteenth, fourteenth, fifteenth, sixteenth, and seventeenth pixels with the fifteenth pixel aligned to the original pixel; and a fifth row includes eighteenth, nineteenth, and twentieth pixels with the nineteenth pixel aligned to the original pixel.

18. A motion tracking process, comprising the steps of:

taking a first image and a second image of a surface via a photo sensing array mechanically coupled to an object at a time interval from each other;

generating a predicted motion vector;

in response to a direction of the predicted motion vector, generating a plurality of image frames from the first image and by shifting the first image to a plurality of pixels arranged in an anisotropic pattern;

generating a plurality of correlation functions by comparing the second image with the plurality of image frames; and generating a motion vector describing a displacement of the object relative to the surface during the time interval from the plurality of correlation functions.

19. The motion tracking process of claim 18, the step of generating a plurality of image frames further including the step of selecting one of four elongated and anisotropic patterns having an axis of symmetry generally along the direction of the predicted motion vector.

20. The motion tracking process of claim 18, the step of generating a plurality of image frames further including the step of selecting the anisotropic pattern comprised of the original pixel and the plurality pixels, wherein:

the anisotropic pattern has an axis of symmetry generally coinciding with the direction of the predicted motion vector;

a number of the pixels along the axis of symmetry is greater than a number of the pixels perpendicular to the axis of symmetry in the anisotropic pattern; and a number of the pixels in the direction of the predicted motion vector is greater than a number of the pixels opposite thereto along the axis of symmetry in the anisotropic pattern.

* * * * *